US011784908B2

United States Patent
Cheng et al.

(10) Patent No.: US 11,784,908 B2
(45) Date of Patent: Oct. 10, 2023

(54) DATA TRANSFER WITH QR CODES

(71) Applicant: INTERNATIONAL BUSINESS MACHINES CORPORATION, Armonk, NY (US)

(72) Inventors: Min Cheng, Beijing (CN); Xiao Xuan Fu, Wuhan (CN); Wen Qi Wq Ye, Beijing (CN); Jiang Yi Liu, Beijing (CN); Si Yu Chen, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 129 days.

(21) Appl. No.: 17/196,519

(22) Filed: Mar. 9, 2021

(65) Prior Publication Data
US 2022/0294726 A1  Sep. 15, 2022

(51) Int. Cl.
*H04L 45/12* (2022.01)
*G06K 7/14* (2006.01)
*H04L 12/18* (2006.01)

(52) U.S. Cl.
CPC ............ *H04L 45/12* (2013.01); *G06K 7/1417* (2013.01); *H04L 12/1868* (2013.01)

(58) Field of Classification Search
None
See application file for complete search history.

(56) References Cited

U.S. PATENT DOCUMENTS

| 4,987,536 A * | 1/1991 | Humblet | H04Q 3/66 370/408 |
| 9,280,541 B2 | 3/2016 | Fried | |
| 9,600,701 B1 * | 3/2017 | Chien | H04B 10/116 |
| 9,832,637 B2 | 11/2017 | Sheng | |
| 2013/0262383 A1 * | 10/2013 | Maeda | G06F 11/2094 707/634 |
| 2015/0082410 A1 * | 3/2015 | Fitzgerald | H04L 63/0853 726/9 |
| 2021/0083992 A1 * | 3/2021 | Didear | H04L 12/4641 |

FOREIGN PATENT DOCUMENTS

| KR | 100652783 B1 | 12/2006 | |
| KR | 1762696 B1 * | 7/2017 | H04L 45/32 |

OTHER PUBLICATIONS

Basam, et al., "Visfer: Camera-based visual data transfer for cross-device visualization," Information Visualization, 2019, vol. 18, Issue 1, pp. 68-93, DOI: 10.1177/1473871617725907, Retrieved from the Internet: <URL: https://journals.sagepub.com/doi/10.1177/1473871617725907>.

* cited by examiner

*Primary Examiner* — Mohamed A. Wasel
*Assistant Examiner* — Mohammad Yousuf A. Mian
(74) *Attorney, Agent, or Firm* — Anthony M. Pallone

(57) ABSTRACT

Methods, apparatus, computer program products for exchange data among air-gapped devices are provided. The method comprises: identifying, by a device in a cluster of devices, a plurality of accessible devices in the cluster via corresponding respective quick response (QR) codes; generating, by the device, logical routing information based on the identified plurality of accessible devices, the logical routing information comprising at least identifiers of the identified plurality of accessible devices; and transmitting, by the device, data encoded in a plurality of QR codes to a destination device in the cluster based on a shortest routing path identified in the logical routing information.

15 Claims, 6 Drawing Sheets

DATA TRANSFER WITH QR CODES

BACKGROUND

The present application relates to computing, and more specifically, to a method, system, and computer program product for transferring data with QR codes.

An 'air gap' is a network security measure employed on one or more devices to ensure that a secure network is physically isolated from unsecure networks, such as the public Internet or an unsecured local area network. An 'air-gapped' device is a device that has no network interfaces, either wired or wireless, connected to outside networks. An air-gapped device is isolated from unsecured networks, meaning that it is not directly connected to the internet, nor is it connected to any other system that is connected to the internet. A true air gapped device is also physically isolated, meaning data can only be passed to it physically (via USB, removable media or a firewire with another machine). Although data can be exchanged via physical medium such as a thumb-drive and physically moved between devices, such use is typically prohibited in environments where devices are configured to handle classified information.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment of the present disclosure, there is provided a computer-implemented method. The computer-implemented method comprises identifying, by a device in a cluster of devices, a plurality of accessible devices in the cluster via corresponding respective quick response (QR) codes. The computer-implemented method also comprises generating, by the device, logical routing information based on the identified plurality of accessible devices, the logical routing information comprising at least identifiers of the identified plurality of accessible devices. The computer-implemented method further comprises transmitting, by the device, data encoded in a plurality of QR codes to a destination device in the cluster based on a shortest routing path identified in the logical routing information.

In one illustrative embodiment of the present disclosure, there is provided a computer-implemented system. The computer-implemented system may include one or more processors, one or more computer-readable memories, one or more computer-readable tangible storage devices, and program instructions stored on at least one of the one or more storage devices for execution by at least one of the one or more processors via at least one of the one or more memories. The program instructions include: program codes to identify a plurality of accessible devices in the cluster via corresponding respective quick response (QR) codes, program codes to generate logical routing information based on the identified plurality of accessible devices, the logical routing information comprising at least identifiers of the identified plurality of accessible devices; and program codes to transmit data encoded in a plurality of QR codes to a destination device in the cluster based on a shortest routing path identified in the logical routing information.

In one illustrative embodiment of the present disclosure, there is provided a computer program product. The computer program product may include one or more computer-readable storage devices and program instructions stored on at least one of the one or more tangible storage devices, the program instructions executable by a processor. The program instructions include: program codes to identify a plurality of accessible devices in the cluster via corresponding respective quick response (QR) codes, program codes to generate logical routing information based on the identified plurality of accessible devices, the logical routing information comprising at least identifiers of the identified plurality of accessible devices; and program codes to transmit data encoded in a plurality of QR codes to a destination device in the cluster based on a shortest routing path identified in the logical routing information.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

Figure 1:
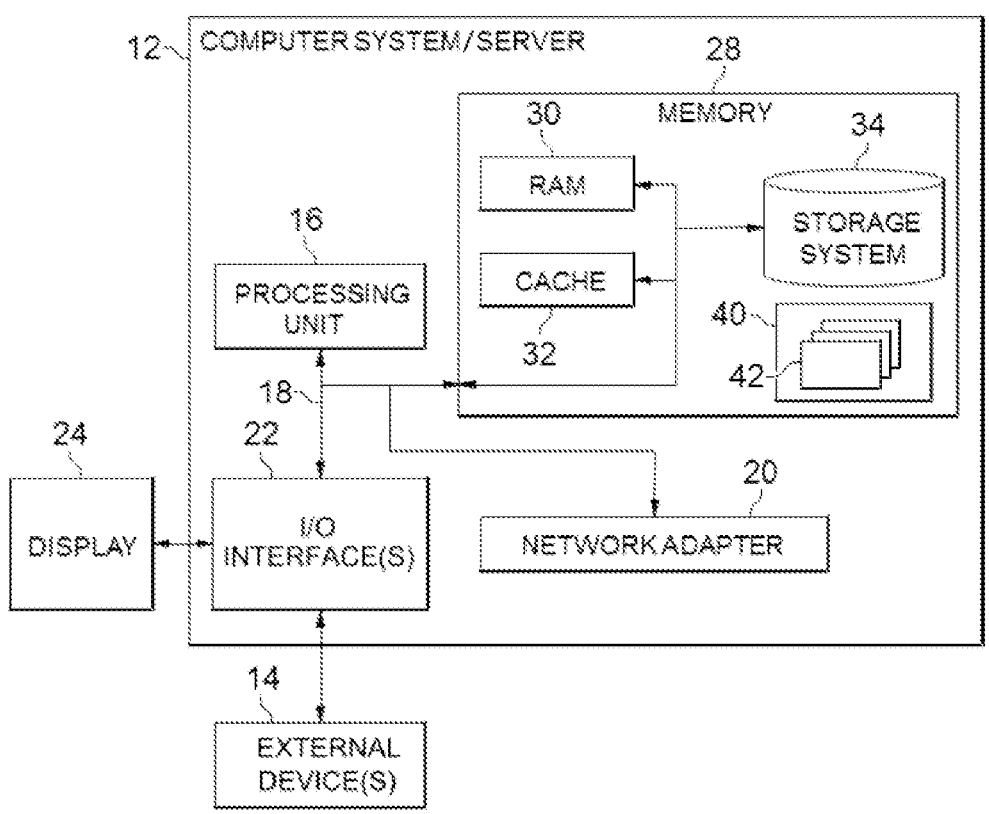
FIG. 1 shows an exemplary computer system which is applicable to implement some embodiments of the present disclosure.

Referring now to FIG. 1, in which an exemplary computer system/server 12 which is applicable to implement the embodiments of the present disclosure is shown. FIG. 1 is also adapted to depict an illustrative example of a portable electronic device such as a communication device which is applicable to implement the embodiments of the present disclosure. Computer system/server 12 is only illustrative and is not intended to suggest any limitation as to the scope of use or functionality of embodiments of the disclosure described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

It should be pointed out that the exemplary computer system/server 12 which is applicable to implement embodiments of the present disclosure is described with reference to FIG. 1 in the above, however, any other existing or future developed systems, apparatuses, devices, etc. are also applicable to implement embodiments of the present disclosure.

It should be pointed out that the exemplary computer system/server 12 described above is merely a generic description of the applicable environment, it should not be interpreted as limitation. According to some embodiments in the present disclosure, network adapter 20 may be disabled or physically removed, such that no network communication with one or more networks is allowed.

It also should be pointed out that according to some embodiments in the present disclosure, some data media interfaces (e.g., USB interface) may be disabled or physically removed, such that no data may be physical exchanged via such data media interfaces.

As described in the background section, an 'air-gapped' device is isolated from unsecured networks, and is also physically isolated. Data exchange among different 'air-gapped' devices would be a challenge if data media interfaces (e.g., USB interface) is disabled due to security concerns. Such air-gapped devices are typically implemented in high security environments, e.g., military systems and government systems. However, there are needs for such systems to exchange data temporarily among different 'air-gapped' devices. Embodiments in the present disclosure provide a method, system, and computer program product to address the needs mentioned above.

The concepts disclosed in the disclosure use Quick Response (QR) codes as intermedia for exchanging data among different air-gapped devices. A QR code is a type of mixed barcode (or two-dimensional barcode) that is a machine-readable optical label which contains information. A QR code may consist of black squares arranged in a square grid on a white background, which can be read by an imaging device and processed using Reed-Solomon error correction until the image can be appropriately interpreted. Any imaging devices may be utilized to capture QR codes. According to specifications of QR codes, the maximum data capacity of a version 40 QR code is 2,953 bytes. A typical version 4 QR code (33×33) may have 68 bytes data encoded.

In order to use QR codes as intermedia for exchanging data among different air-gapped devices, according to some embodiments in the present disclosure, QR codes are designed to be consisted of the function of establishing logical routings among different air-gapped devices and of the function of transferring data using a selected logical routing from a source device to a destination device after logical routings have been generated. The structure of QR code design will be discussed with reference to FIG. 2 in the following.

Figure 2:
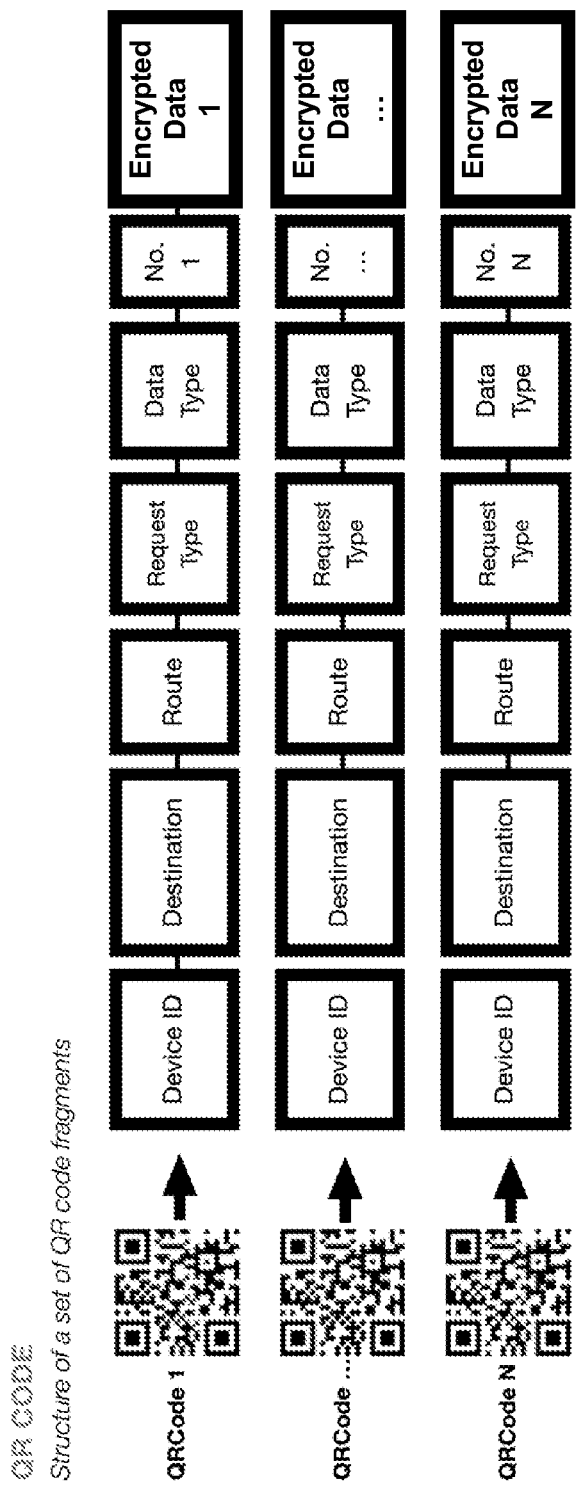
FIG. 2 depicts an exemplary structure of QR codes according to an embodiment of the present disclosure.

Referring now to FIG. 2, which depicts an exemplary structure of a set of QR code fragments according to an embodiment in the present disclosure. A QR code, according to some embodiments, is encoded with the following information: 1) a device identifier (ID) field, which is used to identify the source device that the QR code is from; 2) a destination field, which is used to identify the destination device that the QR code is intended for; 3) a route field, which is used to indicate the information of the shortest path determined by the source device; 4) a request type field, which is used to indicate whether the QR code is for route generation (logical routing information generation phase, which will be discussed later) or for actual data transferring (data transfer phase, which also will be discussed later); 5) a data type field, which is used to indicate the type of transferred file; 6) a QR code sequence number (No.) field, which is used to indicate the sequential number of the QR code in a set of QR codes that belong to the file being transferred; and 7) an encrypted data field, which includes the actual data of the file encrypted and being transferred.

Although it is listed above that seven different types of information are encoded in a QR code (in seven different data fields), fewer or more types of information may be encoded according to some embodiments in the disclosure. For example, in logical routing information generation phase, the destination field, the route field, the data type field, the QR code sequence number field and the encrypted data field may all be left blank, and only the device ID field and the request type field are needed. According to some embodiments in the disclosure, the data of the file being transferred may not be encrypted, thus the encrypted data field listed above as 7) may be in an un-encrypted form.

Figure 3:
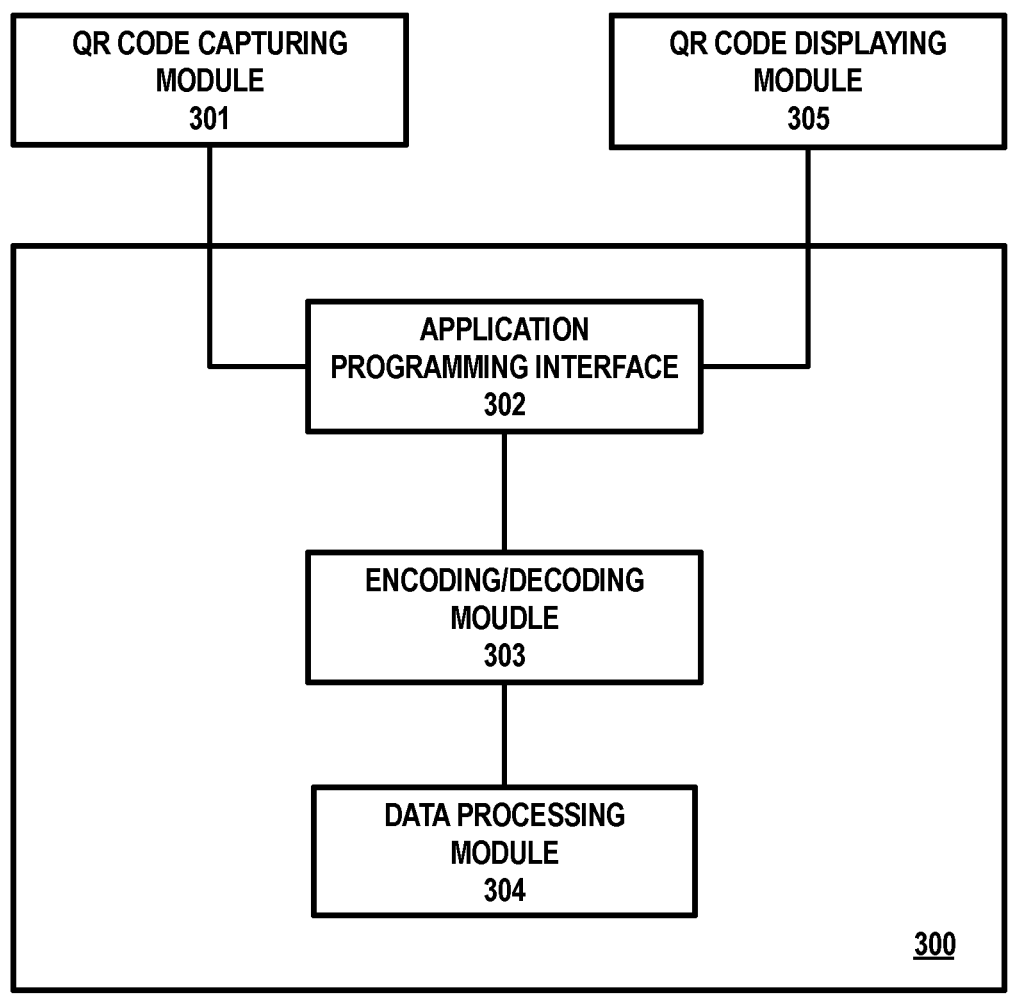
FIG. 3 depicts an exemplary apparatus 300 according to an embodiment of the present disclosure.

Now referring to FIG. 3, which depicts an exemplary apparatus 300 according to an embodiment in the present disclosure. The exemplary apparatus 300 may be in the form of an application installed on each of the air-gapped devices, and may connect via an application programming interface 302 respectively to a QR code capturing module 301 configured to capture QR codes, and to a QR code displaying module 305 configured to display QR codes. The QR code capturing module 301 may be coupled to an air-gapped device, and may be in the form of any image capturing devices. The QR code displaying module 305 may be the display of an air-gapped device.

The exemplary apparatus 300 may also comprise an encoding/decoding module 303, configured to encode corresponding information generated by an air-gapped device into a QR code and decode corresponding information from a QR code captured from displays of other devices, according to some embodiments in the present disclosure.

The exemplary apparatus 300 may also comprise a data processing module 304, configured to process data decoded from a QR code and intended for its processing, according to some embodiments in the present disclosure.

As aforementioned, the design of QR codes according to some embodiments in the disclosure may consist of the function of establishing logical routings among different air-gapped devices. According to some embodiments in the disclosure, the function of establishing logical routings among different air-gapped devices may be implemented in a logical routing information generation phase during which each of the devices may broadcast, via a QR code displayed on its screen (hereinafter referred as broadcasting QR codes), its device ID. The device ID of a broadcasting device may be encoded in a broadcasting QR code (e.g., in the device ID field and in the request type field indicating the QR code is a broadcasting QR code) and displayed on its screen. Any device with the ability of successfully capturing the displayed broadcasting QR code in its field of view (e.g., of its QR code capturing module 301) may capture the broadcasting QR code. The captured broadcasting QR code may then be decoded (e.g., by encoding/decoding module 303) to retrieve the device ID of the broadcasting device. According to some embodiments in the present disclosure, the device that captured the broadcasting QR code may acknowledge the successful receipt of the broadcasting QR code to the broadcasting device by displaying an acknowledging QR code on its screen. The acknowledging QR code may be in a pre-defined format that is designed specifically for the purpose of acknowledgement. The broadcasting device may add the device that captured its broadcasting QR code as an accessible device after successfully capturing the acknowledging QR code.

In the following, the logical routing information generation phase will be discussed with references to FIGS. 4A, 4B, and FIGS. 5A, 5B.

Figure 4A:
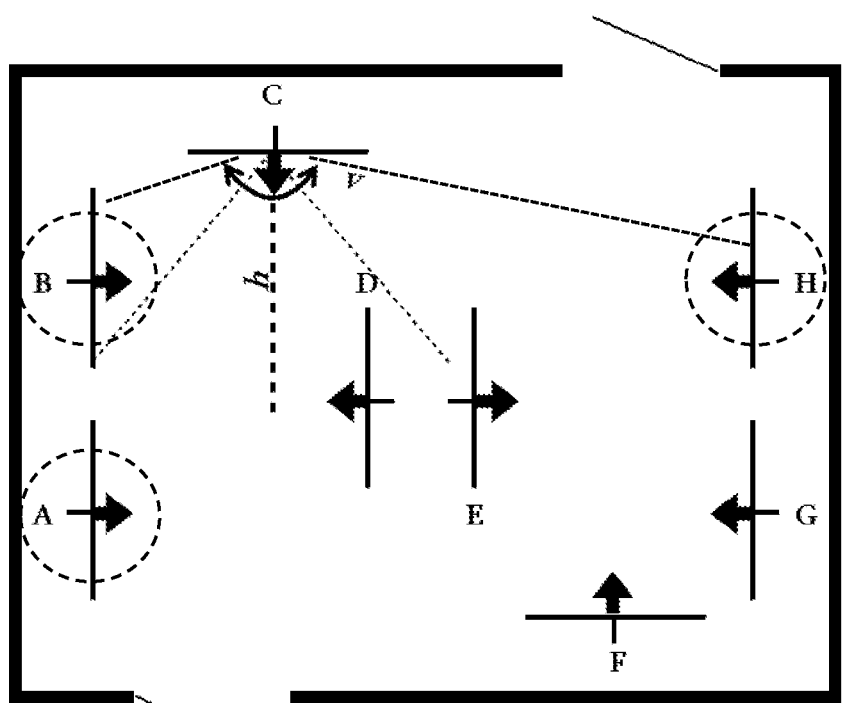
FIGS. 4A and 4B depict an exemplary configuration of a cluster of air-gapped devices in order to exchange data according to some embodiments of the present disclosure.
Figure 4B:
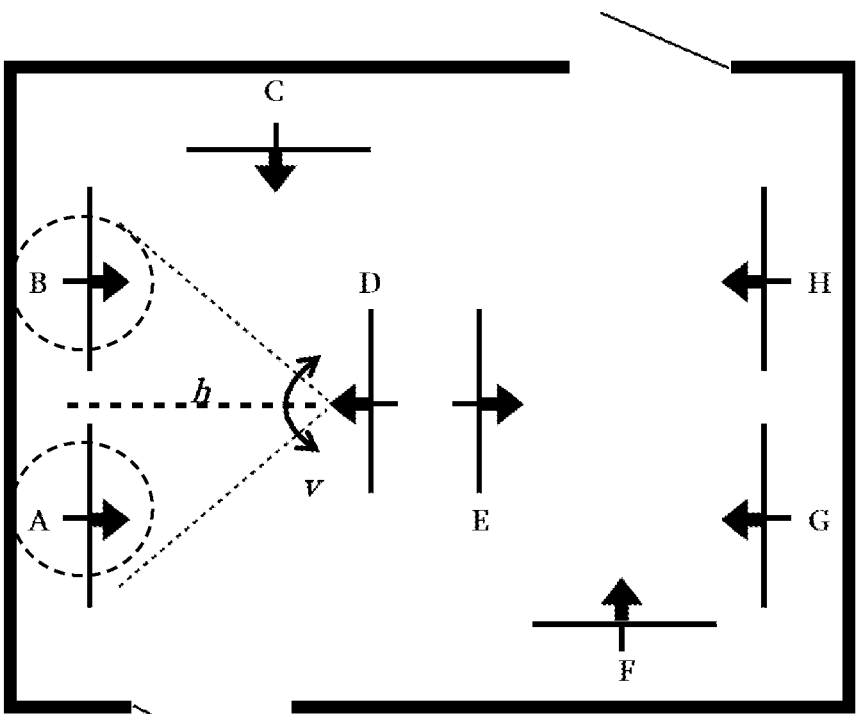

FIGS. 4A and 4B depict an exemplary configuration of a cluster of air-gapped devices in order to exchange data according to some embodiments in the present disclosure. As shown, there are eight air-gapped devices A, B, C, D, E, F, G, H in the cluster of air-gapped devices. The configuration of the devices is to put a device in the field of view of other devices such that corresponding QR code capturing modules may capture QR codes displayed on respective screens.

Take device C as an example, as shown in FIG. 4A, device B, A, and H are in its field of view, illustrated with dashed-line circles, and vice versa. During the logical routing information generation phase, device B, A, H may successfully capture the broadcasting QR code displayed on the screen of device C, and may then display corresponding respective acknowledging QR codes on corresponding respective screens. After successfully capturing corresponding respective acknowledging QR codes from the screens of device B, A, H, device C may identify device B, A, H as accessible devices in the routing information of device C. Similarly, for device D, device A, B may successfully capture the broadcasting QR code displayed on the screen of device D, after successfully capturing corresponding respective QR codes from the screens of device A, B, device D may identify device A, B as accessible devices in the routing information of device D, illustrated with dashed-line circles shown in FIG. 4B. In such way, a first level routing information may be generated for each of the devices in the cluster. That is to say, the first level routing information for a device may comprise the devices from which corresponding respective broadcasting QR codes can be successfully captured, and the devices from which corresponding respective acknowledgements have been successfully received.

According to some embodiments in the present disclosure, after the first level routing information has been generated for a device, the device may further broadcast its first level routing information in a broadcasting QR code (e.g., the device ID in the device ID field, the first level routing information in the route field and in the request type field indicating the QR code is a broadcasting QR code). Other devices successfully capturing the broadcasting QR code may calculate corresponding second level routing information based on the captured broadcasting QR code with first level routing information encoded. In such way, routing information with the first level routing information and the second level routing information may be generated for each of the devices in the cluster.

Referring again to FIGS. 4A and 4B, device A broadcasts its first level routing information for device A (A<→C, A<→D, A<→G) and captured by device C, device C may calculate its second level routing information by adding the routing information (A<→D, A<→G). Here, the symbol '<→' between two different devices means that the two devices are mutually accessible. The routing information (A<→C) will be discarded as it is duplicated with the routing information (C<→A). The updated routing information for device C may be now (C<→A<→D, C<→A<→G). Similarly, device C may also calculate its second level routing information from first level routing information of device B (B<→D, B<→H) and from first level routing information of device H (H<→B, H<→E). And hence, the updated routing information for device C may be now (C<→A<→D, C<→A<→G, C<→A<→D, C<→B<→D, C<→B<→H, C<→H<→B, C<→H<→E). After calculating the second level routing information from the first level routing information of all the devices identified in the first level routing information of a device, the full second level routing information for the device has been generated. The second level routing information generation may continue until all devices have successfully calculated their corresponding second level routing information. The generation of lower levels of routing information is similar to the generation of the second level routing information, and will not be discussed for the purpose of brevity.

According to some embodiments in the present disclosure, the logical routing information generation phase may continue until all devices have successfully calculated all levels of routing information. However, according to some embodiments in the present disclosure, the logical routing information phase may end when certain criteria are met, e.g., a certain level routing information has been generated.

According to some embodiments in the present disclosure, for routes in the same level, a corresponding response time(s) may be associated with a corresponding device(s) in each route. The response time may be calculated based on, for instance, a size of a QR code used by the device, the distance of the device, an average time period between each QR code etc. The response time may reflect the data transfer speed between two devices in a route.

According to some embodiments in the present disclosure, the logical routing information for each device may be updated when a new device joins the cluster. Similarly, according to some embodiments in the present disclosure, the logical routing information for each device may be updated when a device in the cluster is removed. The logical routing information update process is similar to the logical routing information generation phase discussed in the above, thus the details will not be discussed for the purpose of brevity.

According to some embodiments in the present disclosure, the logical routing information for each device in the cluster may be stored in the format of a routing table, or any other appropriate formats. For example, FIGS. 5A and 5B depict exemplary logical routing information stored in a graph according to some embodiments in the present disclosure.

Figure 5A:
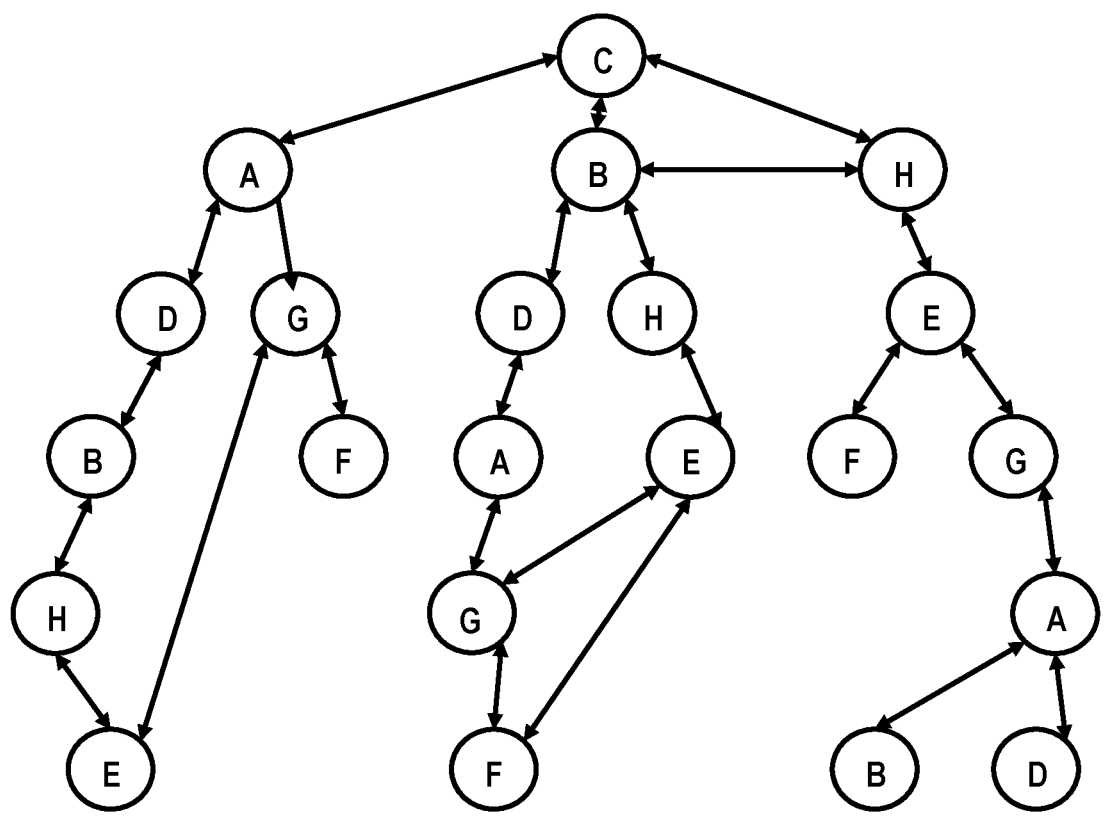
FIGS. 5A and 5B depict exemplary logical routing information, stored in a graph, according to some embodiments of the present disclosure.
Figure 5B:
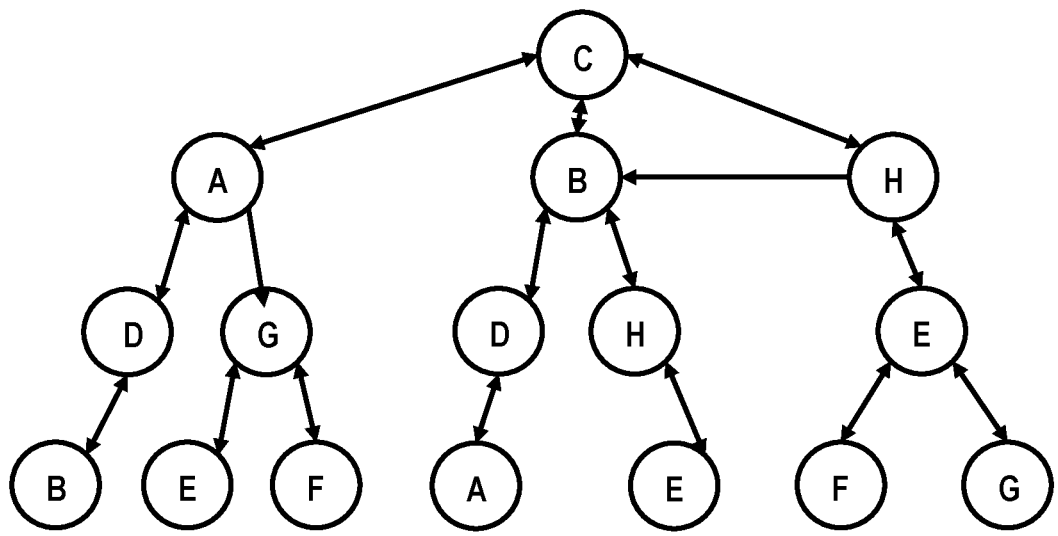

Referring now to FIGS. 5A and 5B, which depict exemplary logical routing information stored in a graph according to some embodiments of the present disclosure. FIG. 5A depicts a full logical routing information, illustrated in the format of a bi-directional graph, according to some embodiments in the present disclosure. As shown, the logical routing information is for device C, shown as the root node in the graph. The first level routing information comprises device A, device B, and device H. Also as shown, the bi-directional arrow between two nodes in a route indicates that the route is bi-directional. That is to say, from device C, device A, device B, and device H are accessible, and vice versa. Also as shown, there is a bi-directional arrow between device B and device H in the first level routing information, which means device B and device H are mutually accessible. Also as shown, the second level routing information comprises device D, device G, device H, and device E, and the third level routing information comprises device A, device B, device E, device F, and device G. It can be seen that when reaching to the third level routing information, all devices in the cluster are already represented in the graph.

FIG. 5B, according to some embodiments in the present disclosure, depicts a three-level logical routing information. As discussed above, the three-level logical routing information has already recorded all devices in the cluster in the routes, which means from device C, all devices in the cluster are accessible.

In the following, data transfer from a source device to a destination device in the cluster will be discussed with reference to FIG. 5B. For example, device C may want to transfer data to device E, according to some embodiments in the present disclosure, device C may check its logical routing information, e.g., recorded in the graph illustrated as shown in FIG. 5B, to determine the possible routing path. It can be seen in FIG. 5B, that from device C to device E, there exist different routing paths, for example, routing path C→A→G→E, routing path C→B→H→E, or routing path C→H→E. Device C may determine the shortest path (e.g., the path with the least number of devices) from device C to device E as the routing path. According to some embodiments in the present disclosure, the determination of the shortest path from device C to device E may also consider the response time between two devices along the routing path.

Suppose, device determines that the shortest routing path from device C to device E is C→H→E, device C then starts to transfer data by encoding the shortest routing path C→H→E into the route field and indicating, in the request type field of corresponding QR codes, that the QR codes are for data transferring. The QR codes for data transferring may then be displayed on the screen of device C for other devices to capture.

Device A, Device B and Device H may capture the QR codes displayed on the screen of device C (as the QR codes are in the field of view of them), and find out that the QR codes are for data transferring via the route C→H→E. If it is found out by a device that the device is on the routing path (e.g., it is the device in the routing path next to the device from which the QR codes are captured) and is not the destination device, the device may encode the captured QR code by replacing the device ID field with its device ID, and display the updated QR codes on its screen for other devices to capture. If the device is the destination device, the device may decode the data from the data field of the QR codes. If it is found out by a device that the device is not on the routing path, the device may do nothing.

For example, Device A, Device B may find out that they are not on the routing path, they will not do anything. Device H may find out that it is on the routing path (e.g., it is the device next to device C from which the QR codes are captured) and it is not the destination device, Device H may encode the captured QR code by replacing the device ID field (device C) with its device ID (device H), and display the updated QR codes on its screen for other devices to capture. Then device B and device E may capture the QR codes displayed on the screen of device H. Device B may find out that it is not on the routing path and do nothing. Device E may find out that it is on the routing path (e.g., it is the device next to device H from which the QR codes are captured) and it is the destination device, Device E may decode the data from data field of the QR codes.

According to some embodiments in the present disclosure, responsive to a successful receipt of data, the destination device may send acknowledgement to the source device via a shortest path identified by the destination device. According to some embodiments in the present disclosure, responsive to a failure of receiving of data, the destination device may send a request for re-sending the failed data via the shortest path identified by the destination device. Upon receiving the request for re-sending, the source device may re-send the failed data.

Figure 6:
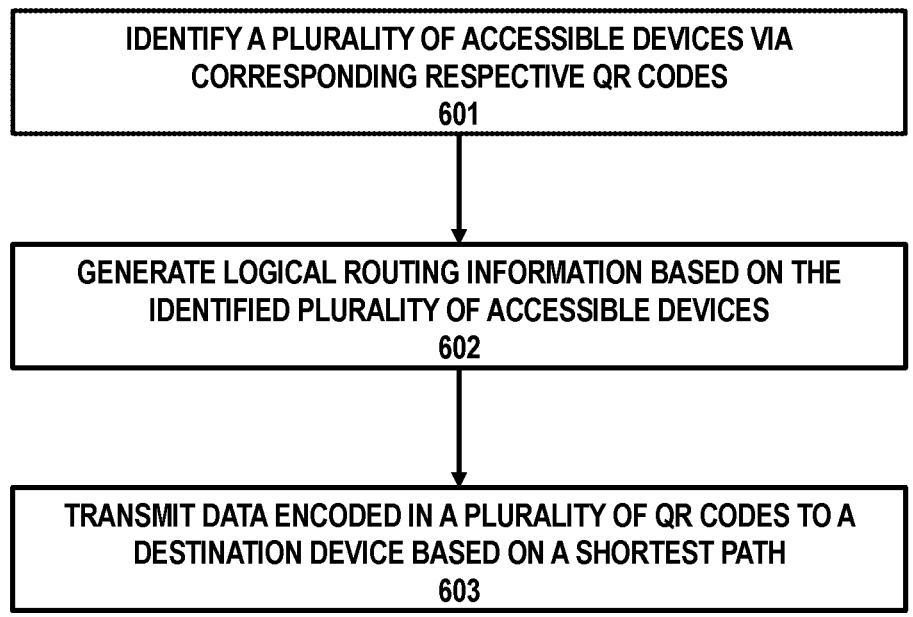
FIG. 6 depicts an exemplary method 600 according to some embodiments of the present disclosure.

Now referring to FIG. 6, which depicts an exemplary method 600 according to some embodiments in the present disclosure.

At step 601, a plurality of accessible devices in a cluster of devices may be identified by a device via corresponding respective QR codes. The cluster of devices may, for example, be the cluster of air-gapped devices as shown in FIGS. 4A and 4B. The plurality of accessible devices may be identified by a logical routing information generation phase described in the above with reference to FIGS. 3, 4A, 4B, 5A and 5B.

At step 602, logical routing information may be generated by the device based on the identified plurality of accessible devices. The generation of logical routing information may, for example, be via corresponding respective broadcasting QR codes, as described in the above.

At step 603, data encoded in a plurality of QR codes may be transmitted by the device to a destination device based on a shortest path identified in the logical routing information. The plurality of QR codes may be encoded with the following information: 1) a device identifier (ID) field, which is used to identify the source device that the QR code is from; 2) a destination field, which is used to identify the destination device that the QR code is intended for; 3) a route field, which is used to indicate the information of the shortest path determined by the device source device; 4) a request type field, which is used to indicate the QR code is for actual data transferring; 5) a data type field, which is used to indicate the type of transferred file; 6) a QR code sequence number field, which is used to indicate the sequential number of the QR code in a set of QR codes that belong to the file being transferred; 7) an encrypted data field, which are the actual data of the file encrypted and being transferred.

According to some embodiments in the present disclosure, the method 600 may further comprise (not shown) broadcasting, by the device, by displaying a QR code with its routing information encoded within; receiving, by the device, an acknowledgement encoded within a QR code from another device in the cluster, the acknowledgement confirming a successful receipt of the broadcasted QR code; and identifying, by the device, the other device in the cluster as an accessible device.

According to some embodiments in the present disclosure, the method 600 may further comprise (not shown) capturing, by the device, a QR code with corresponding routing information of another device encoded within, displayed on the screen of the other device; and acknowledging, by the device, the successful receipt of the QR code to the other device by displaying, on the screen of the device, another QR code with corresponding acknowledging information encoded.

According to some embodiments in the present disclosure, the logical routing information comprises: the devices from which corresponding respective QR codes can be successfully captured, and the devices from which corresponding respective acknowledgements have been successfully received. According to some embodiments in the present disclosure, the logical routing information further comprises: the devices accessible via the devices from which corresponding respective QR codes can be successfully captured, and the devices accessible via the devices from which corresponding respective acknowledgements have been successfully received.

According to some embodiments in the present disclosure, the method 600 may further comprise (not shown) determining, by the device, the shortest path (e.g., the path with the least number of devices) to the destination device based on the logical routing information; encoding, by the device, the shortest path within each of the QR codes with data encoded within; and displaying, by the device, each of the QR codes on its screen.

According to some embodiments in the present disclosure, the method 600 may further comprise (not shown) receiving, by the device, an acknowledgement of the successful receipt of the data from the destination device via the shortest path identified by the destination device.

It should be pointed out that embodiments discussed with references to the figures are merely for the purpose of simplified illustration, therefore they should not adversely limit the scope of the disclosure.

It should be noted that the critical problem (i.e., exchanging data among different air-gapped devices) handling according to embodiments of this disclosure could be implemented by computer system/server 12 of FIG. 1.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    identifying, by a device in a cluster of devices, a plurality of accessible devices in the cluster via corresponding respective quick response (QR) codes;
    generating, by the device, logical routing information based on the identified plurality of accessible devices, the logical routing information comprising at least identifiers of the identified plurality of accessible devices and corresponding respective response times, wherein the logical routing information further comprises first level routing information of devices from which corresponding respective QR codes can be successfully captured by the device, and devices from which corresponding respective acknowledgements have been successfully received by the device, and wherein devices of the first level routing information are within a field of view of the device, and wherein the logical routing information further comprises second level routing information of devices, and wherein devices of the second level routing information are not within the field of view of the device and are accessible, to the device, solely via the devices of the first level routing information; and
    transmitting, by the device, data encoded in a plurality of QR codes to a destination device in the cluster based on a shortest routing path identified in the logical routing information, wherein the shortest routing path considers a response time between the device and the destination device along the shortest routing path.

2. The computer-implemented method of claim 1, wherein the identifying the plurality of accessible devices in the cluster further comprises:
    broadcasting, by the device, by displaying a broadcasting QR code with its routing information encoded within;
    receiving, by the device, an acknowledgement encoded within a QR code from another device in the cluster, the acknowledgement confirming a successful receipt of the broadcasting QR code; and identifying, by the device, the another device in the cluster as an accessible device.

3. The computer-implemented method of claim 1, wherein the identifying the plurality of accessible devices in the cluster further comprises:

capturing, by the device, a QR code with corresponding routing information of another device encoded within, wherein the QR code is displayed on the screen of the another device; and acknowledging, by the device, successful receipt of the QR code to the another device by displaying, on the screen of the device, another QR code with corresponding acknowledging information encoded therein.

4. The computer-implemented method of claim 1, wherein the transmitting the data encoded in the plurality of QR codes to the destination device in the cluster further comprises:

determining, by the device, the shortest routing path to the destination device based on the logical routing information;

encoding, by the device, the shortest routing path within each QR code of the plurality of QR codes with the data encoded therein; and displaying, by the device, each of the QR codes on its screen.

5. The method of claim 1, further comprising:

receiving, by the device, an acknowledgement of successful receipt of the data from the destination device via a shortest path identified by the destination device.

6. A computer-implemented system, comprising:

one or more processors, one or more computer-readable memories, one or more computer-readable tangible storage devices, and program instructions stored on at least one of the one or more storage devices for execution by at least one of the one or more processors via at least one of the one or more memories, wherein the program instructions comprise:

program instructions to identify, by a device in a cluster of devices, a plurality of accessible devices in the cluster via corresponding respective quick response (QR) codes;

program instructions to generate, by the device, logical routing information based on the identified plurality of accessible devices, the logical routing information comprising at least identifiers of the identified plurality of accessible devices and corresponding respective response times, wherein the logical routing information further comprises first level routing information of devices from which corresponding respective QR codes can be successfully captured by the device, and devices from which corresponding respective acknowledgements have been successfully received by the device, and wherein devices of the first level routing information are within a field of view of the device, and wherein the logical routing information further comprises second level routing information of devices, and wherein devices of the second level routing information are not within the field of view of the device and are accessible, to the device, solely via the devices of the first level routing information; and program instructions to transmit, by the device, data encoded in a plurality of QR codes to a destination device in the cluster based on a shortest routing path identified in the logical routing information, wherein the shortest routing path considers a response time between the device and the destination device along the shortest routing path.

7. The computer-implemented system of claim 6, wherein the program instructions to identify the plurality of accessible devices in the cluster further comprises:

program instructions to broadcast, by the device, by displaying a broadcasting QR code with its routing information encoded within;

program instructions to receive, by the device, an acknowledgement encoded within a QR code from another device in the cluster, the acknowledgement confirming a successful receipt of the broadcasting QR code; and program instructions to identify, by the device, the another device in the cluster as an accessible device.

8. The computer-implemented system of claim 6, wherein the program instructions to identify the plurality of accessible devices in the cluster further comprise:

program instructions to capture, by the device, a QR code with corresponding routing information of another device encoded within, wherein the QR code is displayed on the screen of the another device; and program instructions to acknowledge, by the device, successful receipt of the QR code to the another device by displaying, on the screen of the device, another QR code with corresponding acknowledging information encoded therein.

9. The computer-implemented system of claim 6, wherein the program instructions to transmit the data encoded in the plurality of QR codes to the destination device in the cluster further comprises:

program instructions to determine, by the device, the shortest routing path to the destination device based on the logical routing information;

program instructions to encode, by the device, the shortest routing path within each QR code of the plurality of QR codes with the data encoded therein; and program instructions to display, by the device, each of the QR codes on its screen.

10. The computer-implemented system of claim 6, wherein the program instructions further comprise:

program instructions to receive an acknowledgement of successful receipt of the data from the destination device via the shortest path identified by the destination device.

11. A computer program product, comprising one or more non-transitory computer-readable tangible storage devices and program instructions stored on at least one of the one or more tangible storage devices, the program instructions executable by a processor, the program instructions comprising:

program instructions to identify, by a device in a cluster of devices, a plurality of accessible devices in the cluster via corresponding respective quick response (QR) codes;

program instructions to generate, by the device, logical routing information based on the identified plurality of accessible devices, the logical routing information comprising at least identifiers of the identified plurality of accessible devices and corresponding respective response times, wherein the logical routing information further comprises first level routing information of devices from which corresponding respective QR codes can be successfully captured by the device, and devices from which corresponding respective acknowledgements have been successfully received by the device, and wherein devices of the first level routing information are within a field of view of the device, and wherein the logical routing information further comprises second level routing information of devices, and wherein devices of the second level routing information are not within the field of view of the device and are accessible, to the device, solely via the devices of the first level routing information; and program instructions to transmit, by the device, data encoded in a plurality of QR codes to a destination device in the cluster based on a shortest routing path identified in the logical routing information, wherein the shortest routing path considers a response time between the device and the destination device along the shortest routing path.

12. The computer program product of claim 11, wherein the program instructions to identify the plurality of accessible devices in the cluster further comprises:

program instructions to broadcast, by the device, by displaying a broadcasting QR code with its routing information encoded within;

program instructions to receive, by the device, an acknowledgement encoded within a QR code from another device in the cluster, the acknowledgement confirming a successful receipt of the broadcasting QR code; and program instructions to identify, by the device, the another device in the cluster as an accessible device.

13. The computer program product of claim 11, wherein the program instructions to identify the plurality of accessible devices in the cluster further comprise:

program instructions to capture, by the device, a QR code with corresponding routing information of another device encoded within, wherein the QR code is displayed on the screen of the another device; and program instructions to acknowledge, by the device, successful receipt of the QR code to the another device by displaying, on the screen of the device, another QR code with corresponding acknowledging information encoded therein.

14. The computer program product of claim 11, wherein the program instructions to transmit the data encoded in the plurality of QR codes to the destination device in the cluster further comprises:

program instructions to determine, by the device, the shortest routing path to the destination device based on the logical routing information;

program instructions to encode, by the device, the shortest routing path within each QR code of the plurality of QR codes with the data encoded therein; and program instructions to display, by the device, each of the QR codes on its screen.

15. The computer program product of claim 11, wherein the program instructions further comprise:

program instructions to receive an acknowledgement of successful receipt of the data from the destination device via the shortest path identified by the destination device.

* * * * *